Patented May 23, 1944

2,349,542

UNITED STATES PATENT OFFICE 2,349,542

RECOVERY OF GLUE FROM CHROME-TANNED LEATHER

Zoltan Erdeley, Brantford, Ontario, Canada, assignor to Gypsum Lime and Alabastine, Canada, Limited, Toronto, Ontario, Canada No Drawing. Application August 3, 1942, Serial No. 453,467. In Canada July 18, 1942

4 Claims. (Cl. 260—118)

This invention relates to the treatment of leather for the extraction of glue or gelatine, and more particularly to an improved method of treating chrome-tanned leather for the extraction of higher yields of good quality glue or gelatine.

In the usual commercial method of treating chrome-tanned leather, preparatory to the extraction of glue, the leather is treated with an alkali, such as lime, and then with a dilute mineral acid to dissolve the chrome salts rendered soluble by the lime treatment. Relatively low yields of glue are obtainable by this method.

In copending application Serial No. 378,693, filed February 6, 1941, now Patent No. 2,339,405, Albert Hoeren, there is disclosed an improved method wherein the chrome-tanned leather is treated with lime and a borate in aqueous solution.

Further prolonged investigation has shown that substantially improved glue yields are obtained when, by the addition of a soluble calcium salt, the concentration of lime in the detanning solution is not substantially less than 76.5 or more than 88% of saturation. That is, when the solubility of the lime in the aqueous detanning solution is reduced below its normal saturation point at the temperature employed by as much as 12 to 23.5% by the introduction of an independent calcium ion, the glue extraction process gives yields of at least 3 to 10% higher than when lime solution at its normal saturation point is used in detanning the leather.

In carrying out the invention chrome tanned leather is treated with an aqueous lime solution or suspension in which the solubility of the lime is reduced to not more than substantially 88% of its saturation point at the temperature employed by adding to the solution a soluble calcium salt. Calcium chloride is the preferred addition agent for the reduction of the lime solubility. Its use has increased the glue yield by as much as 11.5% over that obtained using lime alone. Other soluble calcium salts which may be used are calcium nitrate, calcium acetate and calcium borate. Lime has relatively small solubility in water. Its solubility varies with the character of the lime, increasing with decreasing temperature. Applicant has found the solubility of the lime used to vary from 0.171 gram per 100 cc. of water at 60° F. to 0.160 gram at 76.5° F. With this lime the preferred lime solution is one which contains in solution between 0.13 to 0.15 gram of $Ca(OH)_2$ per 100 cc. of solution.

The initial detanning solution may be illustrated as follows. For treating 25 grams of dry leather, 12 grams of lime and 5 grams of soluble calcium salt were added to 400 cc. of water. With this amount of the addition agent the amount of $Ca(OH)_2$ in the solution at 76.5° F. was 0.131 gram per 100 cc. of water. The addition of soluble calcium salt may vary from 0.2 to 2.5 grams per 100 cc. of water.

The reactions proceed at normal plant temperatures and when completed the solution is removed from the leather which is washed with water and treated with mineral acid, preferably sulphuric. Following the acid treatment the leather is washed with water and may be rendered neutral or slightly alkaline by the addition of lime or other alkali. The tanning reagents are thus removed with less destruction of the collagen of the leather and leaves the leather in improved condition for the extraction of increased yields of glue or gelatine of good quality under the normal methods of glue extraction from leather.

It appears that for maximum yields of high grade glue the amount of lime actually in solution in the detanning reagent must be below the saturation point and only sufficient to convert all of the chrome into soluble form without affecting the collagen. While the solubility of the lime may be reduced by the introduction of the hydroxyl ion, as by the addition of caustic soda, this has not been found effective in increasing the yield of good grade glue.

I claim:

1. In the treatment of chrome tanned leather for the production of glue and gelatine, the method which comprises treating the chrome tanned leather with an aqueous lime suspension containing a soluble calcium salt to depress the solubility of the lime.

2. In the treatment of chrome tanned leather for the production of glue, the method which comprises subjecting the chrome tanned leather to the action of lime in aqueous solution in the presence of a calcium ion liberated in said solution from calcium chloride to reduce the solubility of the lime in solution.

3. A method as defined in claim 1 wherein the solubility of the lime in the aqueous suspension is not more than 88% of its normal solubility at the saturation point at the temperature of treatment.

4. A method as defined in claim 2 wherein the concentration of lime dissolved in said solution is not more than 88 nor less than 76.5% of its normal concentration at the saturation point.

ZOLTAN ERDELEY.